(12) United States Patent
Chakrabarti et al.

(10) Patent No.: US 11,739,645 B2
(45) Date of Patent: Aug. 29, 2023

(54) VIBRATIONAL DAMPENING ELEMENTS

(71) Applicant: General Electric Company, Schenectady, NY (US)

(72) Inventors: Suryarghya Chakrabarti, Mason, OH (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 17/038,540

(22) Filed: Sep. 30, 2020

(65) Prior Publication Data
US 2022/0098985 A1 Mar. 31, 2022

(51) Int. Cl.
| | | |
|---|---|---|
| *F01D 5/16* | (2006.01) | |
| *F02C 3/04* | (2006.01) | |
| *F16F 15/173* | (2006.01) | |

(52) U.S. Cl.
CPC ............... *F01D 5/16* (2013.01); *F02C 3/04* (2013.01); *F16F 15/173* (2013.01);
(Continued)

(58) Field of Classification Search
CPC ... F01D 5/16; F02C 3/04; F16F 15/173; F16F 2222/08; F16F 2232/02; F16F 2234/02;
(Continued)

(56) References Cited

U.S. PATENT DOCUMENTS 1,833,754 A 11/1931 Paget
2,292,072 A * 8/1942 Hanna ...................... F01D 5/16
188/266

(Continued)

FOREIGN PATENT DOCUMENTS

CN 103321853 B 3/2016
DE 102018123089 A1 3/2019
(Continued)

OTHER PUBLICATIONS

U.S. Appl. No. 16/794,732, filed Feb. 19, 2020.
(Continued)

*Primary Examiner* — Jesse S Bogue
(74) *Attorney, Agent, or Firm* — Dority & Manning, P.A.

(57) ABSTRACT

A vibrational dampening element is attached to a component and configured to adjust the amplitude of oscillations of the component. The vibrational dampening element includes a mass. The mass includes a main body and a member extending from the main body. A casing that encapsulates the mass. A fluidic chamber defined between the mass and the casing. A first fluidic portion is disposed between a first side of the mass and the casing. The first fluidic portion includes a first accumulator portion directly neighboring the member. A second fluidic portion is disposed between a second side of the mass and the casing. The second fluidic portion includes a second accumulator portion directly neighboring the member. The first accumulator portion is in fluid communication with the second accumulator portion. The vibrational dampening element further includes a primary passage that extends between the first fluidic portion and the second fluidic portion.

17 Claims, 9 Drawing Sheets

(52) U.S. Cl.
CPC ...... *F05D 2240/30* (2013.01); *F05D 2240/35* (2013.01); *F05D 2260/96* (2013.01); *F16F 2222/08* (2013.01); *F16F 2232/02* (2013.01); *F16F 2234/02* (2013.01)

(58) Field of Classification Search
CPC ............ F05D 2240/30; F05D 2240/35; F05D 2260/96
See application file for complete search history.

(56) References Cited

U.S. PATENT DOCUMENTS

| | | | |
|---|---|---|---|
| 2,349,187 | A | 5/1944 | Meyer |
| 2,689,107 | A | 9/1954 | Odegaard |
| 2,984,453 | A | 5/1961 | Heymann |
| 3,576,377 | A | 4/1971 | Beanland et al. |
| 3,893,782 | A | 7/1975 | Pierpoline et al. |
| 3,966,357 | A * | 6/1976 | Corsmeier ............ F01D 5/189 416/500 |
| 3,986,792 | A | 10/1976 | Warner |
| 4,460,314 | A | 7/1984 | Fuller |
| 5,165,860 | A | 11/1992 | Stoner et al. |
| 5,219,144 | A | 6/1993 | Fox et al. |
| 5,232,344 | A * | 8/1993 | El-Aini ............ F01D 5/16 416/500 |
| 5,407,321 | A | 4/1995 | Rimkunas et al. |
| 5,449,152 | A | 9/1995 | Byrnes et al. |
| 5,498,137 | A | 3/1996 | El-Aini et al. |
| 5,522,705 | A | 6/1996 | Elaini et al. |
| 5,558,497 | A | 9/1996 | Kraft et al. |
| 5,599,165 | A | 2/1997 | Elaini et al. |
| 5,730,584 | A | 3/1998 | Dodd |
| 6,039,542 | A | 3/2000 | Schilling et al. |
| 6,155,789 | A | 12/2000 | Mannava et al. |
| 6,193,465 | B1 | 2/2001 | Liotta et al. |
| 6,212,974 | B1 * | 4/2001 | Van Duyn ............ F02C 7/32 244/54 |
| 6,224,341 | B1 | 5/2001 | Fricke |
| 6,283,707 | B1 | 9/2001 | Chin |
| 6,371,727 | B1 | 4/2002 | Stangeland et al. |
| 6,514,040 | B2 | 2/2003 | Lewis et al. |
| 6,607,359 | B2 | 8/2003 | von Flotow |
| 6,669,447 | B2 | 12/2003 | Norris et al. |
| 6,685,435 | B2 | 2/2004 | Davis et al. |
| 6,752,594 | B2 | 6/2004 | Miller et al. |
| 6,827,551 | B1 | 12/2004 | Duffy et al. |
| 6,929,451 | B2 | 8/2005 | Gregg et al. |
| 6,979,180 | B2 | 12/2005 | Motherwell |
| 7,070,390 | B2 | 7/2006 | Powell |
| 7,125,225 | B2 | 10/2006 | Surace et al. |
| 7,217,093 | B2 | 5/2007 | Propheter et al. |
| 7,270,517 | B2 | 9/2007 | Gamer |
| 7,300,256 | B2 | 11/2007 | Masserey et al. |
| 7,347,664 | B2 | 3/2008 | Kayser et al. |
| 7,413,405 | B2 | 8/2008 | Busbey et al. |
| 7,736,124 | B2 | 6/2010 | Bauer et al. |
| 7,811,063 | B2 | 10/2010 | Bonnet |
| 7,824,158 | B2 | 11/2010 | Bauer et al. |
| 7,955,054 | B2 | 6/2011 | El-Aini et al. |
| 8,105,039 | B1 | 1/2012 | El-Aini et al. |
| 8,172,541 | B2 | 5/2012 | Cairo |
| 8,231,352 | B2 | 7/2012 | Hunt et al. |
| 8,267,662 | B2 | 9/2012 | Patrick et al. |
| 8,292,583 | B2 | 10/2012 | Marra |
| 8,568,088 | B2 | 10/2013 | Richter |
| 8,579,181 | B2 | 11/2013 | Strother et al. |
| 8,579,593 | B2 | 11/2013 | Campbell et al. |
| 8,596,980 | B2 | 12/2013 | Miller |
| 8,641,369 | B2 | 2/2014 | Rodriguez |
| 8,951,013 | B2 | 2/2015 | Miller et al. |
| 9,011,104 | B2 | 4/2015 | Delvaux et al. |
| 9,121,288 | B2 | 9/2015 | Campbell et al. |
| 9,249,668 | B2 | 2/2016 | Fisk et al. |
| 9,334,740 | B2 | 5/2016 | Kellerer et al. |
| 9,399,920 | B2 | 7/2016 | Miller et al. |
| 9,574,450 | B2 | 2/2017 | Spracher et al. |
| 9,587,496 | B2 | 3/2017 | Collins et al. |
| 9,840,916 | B2 | 12/2017 | Stiehler et al. |
| 9,879,551 | B2 | 1/2018 | Blaney et al. |
| 9,903,434 | B2 * | 2/2018 | Erno .................. F16F 15/366 |
| 10,021,779 | B1 | 7/2018 | Hart |
| 10,132,169 | B2 | 11/2018 | McDufford |
| 10,151,204 | B2 | 12/2018 | Houston et al. |
| 10,196,908 | B2 | 2/2019 | Bielek et al. |
| 10,221,699 | B2 | 3/2019 | McDufford et al. |
| 10,287,895 | B2 | 5/2019 | McDufford |
| 10,316,670 | B2 | 6/2019 | Morris et al. |
| 2004/0253115 | A1 | 12/2004 | Williams et al. |
| 2005/0047918 | A1 | 3/2005 | Powell |
| 2006/0000220 | A1 * | 1/2006 | Sattinger ............ F23M 20/005 60/725 |
| 2007/0110578 | A1 | 5/2007 | Stommel |
| 2007/0217918 | A1 | 9/2007 | Baker et al. |
| 2007/0253828 | A1 | 11/2007 | Masserey et al. |
| 2013/0058785 | A1 * | 3/2013 | Kellerer ............ F01D 5/16 416/1 |
| 2013/0264757 | A1 * | 10/2013 | Rajasekaran ............ F16F 7/00 156/60 |
| 2014/0023506 | A1 | 1/2014 | Kleinow |
| 2015/0176413 | A1 | 6/2015 | Weber et al. |
| 2015/0345296 | A1 | 12/2015 | Davidson et al. |
| 2015/0345307 | A1 | 12/2015 | Davidson et al. |
| 2015/0345309 | A1 | 12/2015 | Davidson et al. |
| 2016/0024940 | A1 | 1/2016 | Wilber |
| 2016/0083101 | A1 * | 3/2016 | Ronski ............ F02C 7/32 432/63 |
| 2016/0084089 | A1 | 3/2016 | Blaney et al. |
| 2016/0108737 | A1 | 4/2016 | Batt et al. |
| 2016/0319669 | A1 | 11/2016 | Morris et al. |
| 2016/0341221 | A1 | 11/2016 | Twelves, Jr. et al. |
| 2018/0230818 | A1 | 8/2018 | Chakrabarti et al. |
| 2018/0258775 | A1 | 9/2018 | Deallenbach et al. |
| 2020/0191016 | A1 * | 6/2020 | Ertas .................. F16C 32/0622 |
| 2021/0317744 | A1 * | 10/2021 | Watanabe ............ F04D 29/322 |

FOREIGN PATENT DOCUMENTS

| | | |
|---|---|---|
| DK | 177924 B1 | 1/2015 |
| EP | 1640562 A1 | 3/2006 |
| EP | 1892377 A1 | 2/2008 |
| EP | 1980715 A1 | 10/2008 |
| EP | 2019188 A1 | 1/2009 |
| EP | 2584146 A1 | 4/2013 |
| EP | 2597265 A1 | 5/2013 |
| EP | 2851510 A1 | 3/2015 |
| EP | 3029268 A1 | 6/2016 |
| EP | 2840256 B1 | 12/2016 |
| JP | 6278447 B2 | 2/2018 |
| JP | 6278448 B2 | 2/2018 |
| JP | 2018/135803 A | 8/2018 |
| WO | WO2010/025732 A3 | 3/2010 |
| WO | WO2013/162887 A1 | 10/2013 |
| WO | WO2015/085078 A1 | 6/2015 |
| WO | WO2017/146724 A1 | 8/2017 |
| WO | WO2020122885 A1 | 6/2020 |

OTHER PUBLICATIONS

Giridhar et al., Gas Turbine Blade Damper Optimization Methodology, Advances in Acoustics and Vibration, Article ID 316761, vol. 2012, pp. 1-13.

Wang et al., Dynamic Characteristics of Blade with Viscoelastic Damping Block Based on Complex Eigenvalue Method, Shock and Vibration, Article ID 5068901, vol. 2018, pp. 1-16.

Zhang et al., Edgewise Vibration Control of Wind Turbine Blades Using Roller and Liquid Dampers, Journal of Physics Conference Series, vol. 524, 2014, pp. 01-11.

Zhang et al., Mitigation of Edgewise Vibrations in Wind Turbine Blades by Means of Roller Dampers, Journal of Sound and Vibration, vol. 333, 2014, pp. 5283-5298.

(56) References Cited

OTHER PUBLICATIONS

European Search Report Corresponding to U.S. Appl. No. 21/187,048 dated Dec. 20, 2021.

* cited by examiner

VIBRATIONAL DAMPENING ELEMENTS

STATEMENT REGARDING FEDERALLY SPONSORED RESEARCH OR DEVELOPMENT

This invention was made with Government support under Contract No. DE-FE0031613 awarded by the United States Department of Energy. The Government has certain rights in this invention.

FIELD

The present disclosure relates generally to vibrational dampening elements configured to adjust the amplitude of oscillations of a component. Specifically, the present disclosure relates generally to vibrational dampening elements configured to adjust the amplitude of oscillations of a turbomachine component.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Typically, turbomachine rotor blades are exposed to unsteady aerodynamic loading which causes the rotor blades to vibrate. If these vibrations are not adequately damped, they may cause high cycle fatigue and premature failure in the blades. Of all the turbine stages, the last-stage blade (LSB) is the tallest and therefore is the most vibrationally challenged component of the turbine. Conventional vibration damping methods for turbine blades include platform dampers, damping wires, shrouds etc.

Platform dampers sit underneath the blade platform and are effective for medium and long shank blades which have motion at the blade platform. IGT aft-stage blades have short shanks to reduce the weight of the blade and in turn reduce the pull load on the rotor which renders platform dampers ineffective.

Generally, turbomachine rotor blades get their damping primarily from the shrouds. Shrouds can be at the blade tip (tip-shroud) or at a partial span between the hub and tip (part-span shroud). These shrouds contact against adjacent blades and provide damping when they rub against each other.

While shrouds provide damping and stiffness to the airfoil, they make the blade heavier which, in turn increases the pull load on the rotor increasing the weight and cost of the rotor. Thus light-weight solutions for aft-stage blades are attractive to drive overall power output of the turbomachine. Generally, shrouds can create aero performance losses. For example, tip-shrouds need a large tip fillet to reduce stress concentrations which creates tip losses, and part-span shrouds create an additional blockage in the flow path and reduce aero efficiency. Lastly, it has been shown that tip shrouds induce significant twist in the vibration mode shapes of the blade causing high aeroelastic flutter instability.

Accordingly, a system that adjusts and/or entirely eliminates the shrouds on a turbomachine rotor blade, while still providing vibrational damping, is desired in the art.

BRIEF DESCRIPTION

Aspects and advantages of the vibrational dampening elements, rotor blades, and turbomachines in accordance with the present disclosure will be set forth in part in the following description, or may be obvious from the description, or may be learned through practice of the technology.

In accordance with one embodiment, a vibrational dampening element is provided. The vibrational dampening element is attached to a component and configured to adjust the amplitude of oscillations of the component. The vibrational dampening element includes a mass. The mass includes a main body and a member extending from the main body. The vibrational dampening element further includes a casing that encapsulates the mass. A fluidic chamber is defined between the mass and the casing and filled with a fluid. A first fluidic portion of the fluidic chamber is disposed between a first side of the mass and the casing. The first fluidic portion includes a first accumulator portion directly neighboring the member. A second fluidic portion of the fluidic chamber is disposed between a second side of the mass and the casing. The second fluidic portion includes a second accumulator portion directly neighboring the member. The first accumulator portion is in fluid communication with the second accumulator portion. The vibrational dampening element further includes a primary passage that extends between the first fluidic portion and the second fluidic portion.

In accordance with another embodiment, a rotor blade is provided. The rotor blade includes a platform. The rotor blade further includes a shank that extends radially inward from the platform. The rotor blade further includes an airfoil that extends radially outward from a root coupled to the platform to a tip. A vibrational dampening element is attached to the rotor blade and configured to adjust the amplitude of oscillations of the rotor blade. The vibrational dampening element includes a mass. The mass includes a main body and a member extending from the main body. The vibrational dampening element further includes a casing that encapsulates the mass. A fluidic chamber defined between the mass and the casing and filled with a fluid. A first fluidic portion of the fluidic chamber is disposed between a first side of the mass and the casing. The first fluidic portion includes a first accumulator portion directly neighboring the member. A second fluidic portion of the fluidic chamber is disposed between a second side of the mass and the casing. The second fluidic portion includes a second accumulator portion directly neighboring the member. The first accumulator portion is in fluid communication with the second accumulator portion. The vibrational dampening element further includes a primary passage that extends between the first fluidic portion and the second fluidic portion.

In accordance with yet another embodiment, a turbomachine is provided. The turbomachine includes a compressor section, a combustor section, and a turbine section. A plurality of rotor blades provided in the turbine section. Each of the plurality of rotor blades includes a shank that extends radially inward from the platform. The rotor blade further includes an airfoil that extends radially outward from a root coupled to the platform to a tip. A vibrational dampening element is attached to the rotor blade and configured to adjust the amplitude of oscillations of the rotor blade. The vibrational dampening element includes a mass. The mass includes a main body and a member extending from the main body. The vibrational dampening element further includes a casing that encapsulates the mass. A fluidic chamber is defined between the mass and the casing and filled with a fluid. A first fluidic portion of the fluidic chamber is disposed between a first side of the mass and the casing. The first fluidic portion includes a first accumulator portion directly neighboring the member. A second fluidic portion of the fluidic chamber is disposed between a second side of the mass and the casing. The second fluidic portion includes a second accumulator portion directly neighboring the member. The first accumulator portion is in fluid communication with the second accumulator portion. The vibrational dampening element further includes a primary passage that extends between the first fluidic portion and the second fluidic portion.

These and other features, aspects and advantages of the present vibrational dampening elements, rotor blades, and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present vibrational dampening elements, rotor blades, and turbomachines, including the best mode of making and using the present systems and methods, directed to one of ordinary skill in the art, is set forth in the specification, which makes reference to the appended figures, in which.

DETAILED DESCRIPTION

Figure 1:
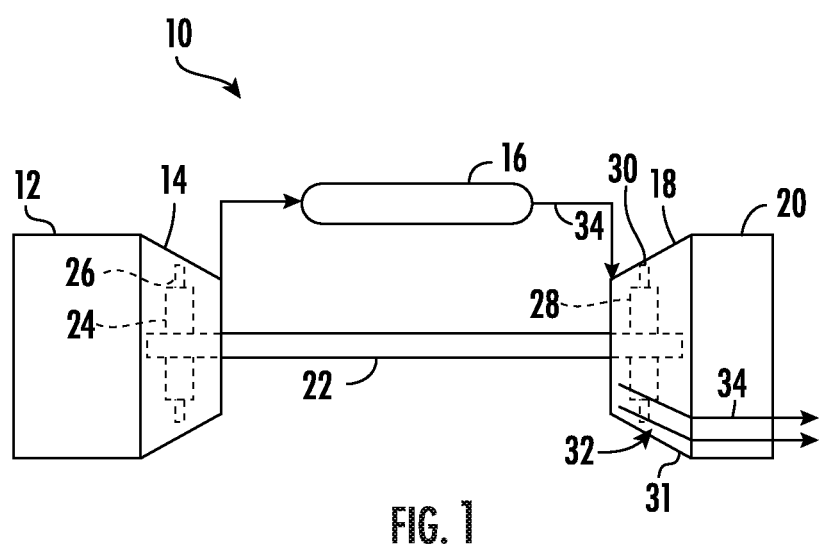
FIG. 1 illustrates a schematic illustration of a turbomachine in accordance with embodiments of the present disclosure.

Reference now will be made in detail to embodiments of the present vibrational dampening elements, rotor blades, and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 provides a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine, unless otherwise specified in the claims. For example, the rotor blades as described herein may be used in any type of turbomachine including but not limited to a steam turbine, an aircraft gas turbine, or a marine gas turbine.

As shown, the gas turbine 10 generally includes an inlet section 12, a compressor section 14 disposed downstream of the inlet section 12, one or more combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds a portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within one or more combustors to produce combustion gases 34. The combustion gases 34 flow through the hot gas path 32 from the combustor section 16 into the turbine section 18, where energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
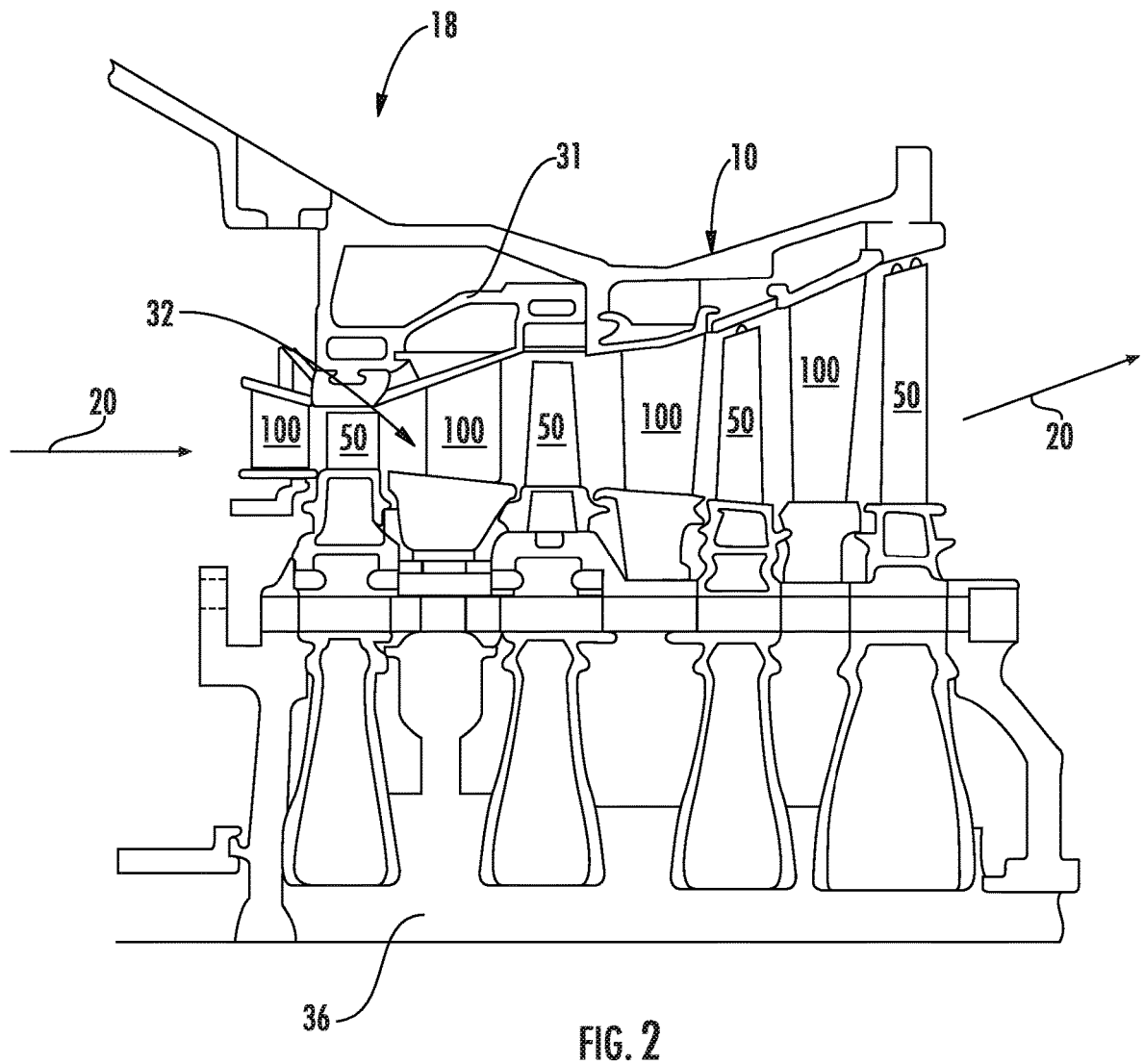
FIG. 2 illustrates an exemplary turbine section of a gas turbine including a plurality of turbine stages arranged in serial flow order, in accordance with embodiments of the present disclosure.

FIG. 2 illustrates an exemplary turbine section 18 of the gas turbine 10 including a plurality of turbine stages arranged in serial flow order. Each stage of the turbine includes a row of stationary turbine nozzles or vanes (e.g., nozzles 100) disposed axially adjacent to a corresponding rotating row of turbine rotor blades (e.g., blades 50). Four turbine stages are illustrated in FIG. 2. The exact number of stages of the turbine section 18 may be more or less than the four stages illustrated in FIG. 2. The four stages are merely exemplary of one turbine design and are not intended to limit the presently claimed turbine rotor blade in any manner.

Each stage comprises a plurality of turbine nozzles or vanes 100 and a plurality of turbine rotor blades 50. The turbine nozzles 100 are mounted to the outer casing 31 and are annularly arranged about an axis of a turbine shaft 22. The turbine rotor blades 50 are annularly arranged about the turbine shaft 22 and coupled to the turbine rotor 36.

It will be appreciated that the turbine nozzles 100 and turbine rotor blades 50 are disposed or at least partially disposed within the hot gas path 32 of the turbine section 18. The various stages of the turbine 10 at least partially define the hot gas path 32 through which combustion gases, as indicated by arrows 20, flow during operation of the gas turbine 10.

Figure 3:
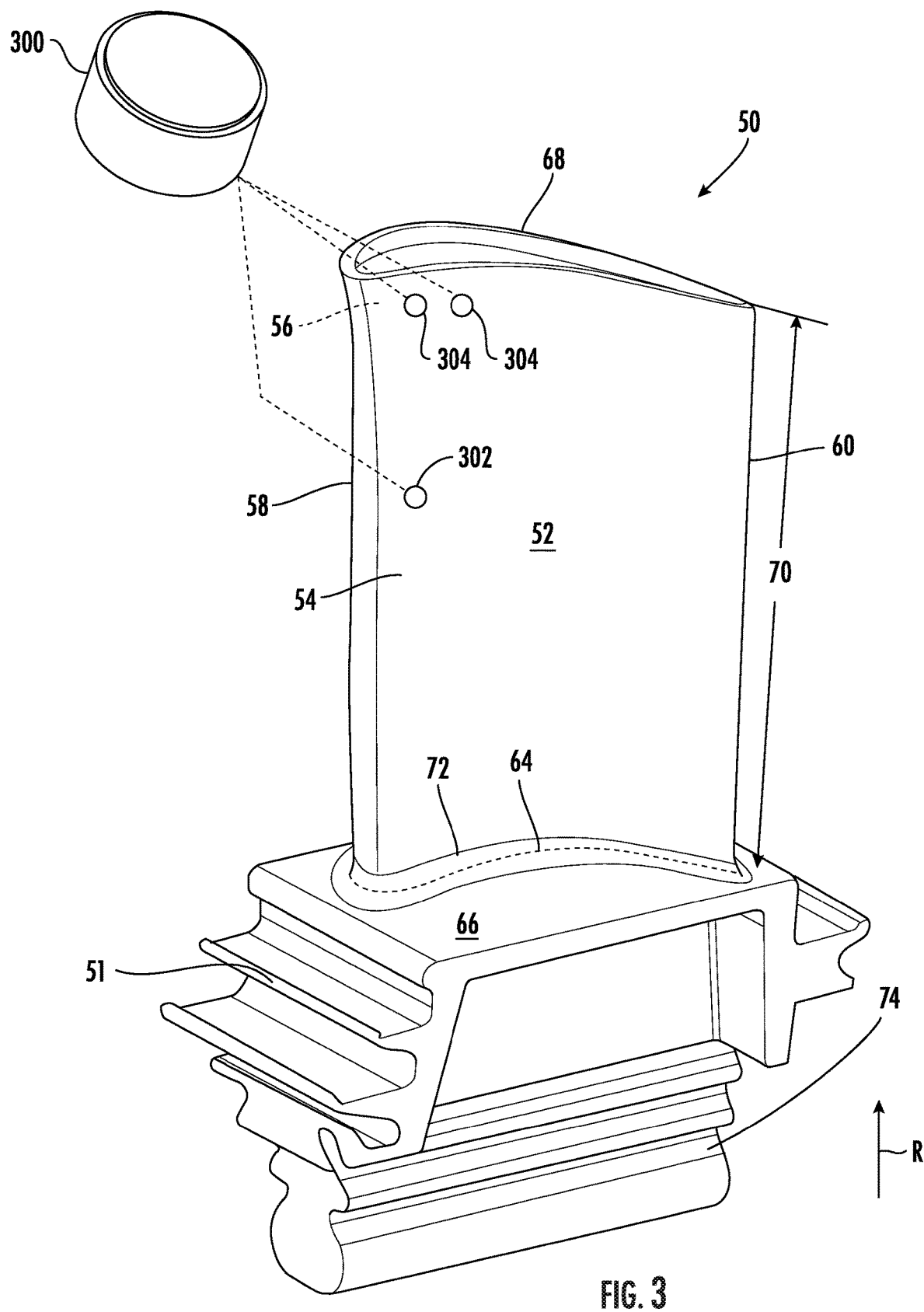
FIG. 3 illustrates a perspective view of a rotor blade, in accordance with embodiments of the present disclosure.

FIG. 3 provides a perspective view of a rotor blade 50 as may be incorporated in any stage of the turbine section 18 or the compressor section 14. In exemplary embodiments, the rotor blade 50 may for use within the turbine section 18. As shown in FIG. 3, the turbine rotor blade 50 includes a platform 66, a shank 51, and an airfoil 52. As shown, the shank, 51 may extend radially inward from the platform 66 with respect to the axial centerline of the gas turbine 10. In many embodiments, the airfoil 52 may extend from the platform 51 opposite the shank 66. For example, the airfoil 52 may extend radially outward from the platform with respect to the axial centerline of the gas turbine 10. In various embodiments, the airfoil 52 includes a pressure side surface 54 and an opposing suction side surface 56. The pressure side surface 54 and the suction side surface 56 meet or intersect at a leading edge 58 and a trailing edge 60 of the airfoil 52. The leading edge 58 and the trailing edge 60 may be spaced apart from one another and define the terminal ends of the airfoil 52 in the axial direction A. A straight chord line (not shown) extends between the leading edge 58 and the trailing edge 60 such that pressure and suction side surfaces 54, 56 extend in chord or chordwise between the leading edge 58 and the trailing edge 60.

The pressure side surface 54 generally comprises an aerodynamic, concave external surface of the airfoil 52. Similarly, the suction side surface 56 may generally define an aerodynamic, convex external surface of the airfoil 52. The leading edge 58 of airfoil 52 may be the first portion of the airfoil 52 to engage, i.e., be exposed to, the combustion gases along the hot gas path 32. The combustion gases may be guided along the aerodynamic contour of airfoil 52, i.e., along the suction side surface 56 and pressure side surface 54, before being exhausted at the trailing edge 60.

As shown in FIG. 3, the airfoil 52 includes a root or first end 64, which intersects with and extends radially outwardly from a platform 66 of the turbine rotor blade 50. The airfoil 52 terminates radially at a second end or tip 68 of the airfoil 52. The root 64 of the airfoil 52 may be defined at an intersection between the airfoil 52 and the platform 66. The tip 68 is disposed radially opposite the root 64. As such, the tip 68 may generally define the radially outermost portion of the rotor blade 50 and, thus, may be configured to be positioned adjacent to a stationary shroud or seal (not shown) of the turbine section 18.

The pressure and suction side surfaces 54, 56 extend in span and define a span length 70 of the airfoil 52 between the root 64 and/or the platform 66 and the tip 68 of the airfoil 52. In other words, each rotor blade 50 includes an airfoil 52 having opposing pressure and suction side surfaces 54, 56 that extend in chord or chordwise between opposing leading and trailing edges 58, 60 and that extend in span or spanwise 70 between the root 64 and the tip 68 of the airfoil 52.

In particular configurations, the airfoil 52 may include a fillet 72 formed between the platform 66 and the airfoil 52 proximate to the root 64. The fillet 72 can include a weld or braze fillet, which can be formed via conventional MIG welding, TIG welding, brazing, etc., and can include a profile that can reduce fluid dynamic losses as a result of the presence of fillet 72. In particular embodiments, the platform 66, the airfoil 52 and the fillet 72 can be formed as a single component, such as by casting and/or machining and/or 3D printing and/or any other suitable technique now known or later developed and/or discovered. In particular configurations, the rotor blade 50 includes a mounting portion 74 (such as a dovetail joint), which is formed to connect and/or to secure the rotor blade 50 to the shaft 22.

The span length 70 may be measured from the root 64 to the tip 68 of the airfoil 52. A percentage of the span length 70 may be used to indicate a position along the span length 70. For example, "0% span" may refer to the root 64 of the airfoil 52. Similarly, "100% span" may refer the tip 68 of the airfoil.

As shown in FIG. 3, a vibrational dampening element 300 may be attached to the rotor blade 50, in order to adjust the amplitude of oscillations of the rotor blade when the gas turbine 10 is in operation. As shown, in some embodiments, the vibrational dampening element(s) 300 may be attached proximate the leading edge 58 of the airfoil 52. In other embodiments (not shown), the vibrational dampening element(s) 300 may be attached proximate the trailing edge 60, on or underneath the platform 66, on or within the pressure side surface 54, on or within the suction side surface 56, and/or on or within the shank 66.

In exemplary embodiments, the vibrational damping element 300 may be attached to the interior of the rotor blade 50, e.g. by welding or brazing, such that it reduces and/or entirely eliminates the oscillations of the rotor blade 50 without creating any impediment to the flow of combustion gases over the exterior of the airfoil 52. For example, the vibrational damping element(s) 300 may be disposed within the airfoil 52, such that they are fixedly coupled to an interior surface of the airfoil 52. In such embodiments the vibrational damping element 300 may be housed within the airfoil 52, thereby advantageously providing damping to the rotor blade 50 without creating any additional blockage to the flow of combustion gases 36. In other embodiments (not shown), the vibrational damping 300 element may be directly fixedly coupled to the exterior surface of the airfoil 52, e.g., by welding and/or brazing. The vibrational dampening element 300 may be large enough to significantly decrease and/or eliminate damage causing vibrations of the airfoil 52 during operation, but small enough not to cause an impediment to the flow of combustion gases over the airfoil 52, thereby not causing an impact to the aerodynamic efficiency of the rotor blade 50.

As shown in FIG. 3, one or more vibrational dampening elements 300 may be positioned along various locations of the airfoil 52, e.g., between 0% and 100% of the span length 70 of the airfoil 52. For example, the rotor blade 50 may include one or more mid-span vibrational dampening elements 302, which may be positioned in the mid-span region of the airfoil 52. For example, the mid-span vibrational dampening element(s) 302 may be positioned on the airfoil 52 between about 25% and about 75% of the span length 70 of the airfoil 52. In particular embodiments, one or more vibrational dampening elements 300 may be positioned on the airfoil 52 between about 40% and about 60% of the span length 70 of the airfoil 52.

As shown in FIG. 3, the rotor blade 50 may further include one or more tip-span vibrational dampening elements 304, which are radially separated from the mid-span vibrational dampening element(s) 302. In various embodiments, the tip-span vibrational dampening element(s) 304 may be positioned between about 75% and about 100% of the span length 70 of the airfoil 52. In particular embodiments the tip-span vibrational dampening element(s) 304 may be positioned between about 90% and about 100% of the span length 70 of the airfoil 52.

In many embodiments, each of the dampening elements 302, 304 may be sized differently, in order to target a specific frequency range of the rotor blade 50. For example, the tip-span vibrational damping element(s) 304 may be sized such that they are tuned to natural frequencies where the rotor blade 50 mode of vibration is predominantly at the tip. Similarly, the mid-span vibrational dampening element 302 may be sized such that they are tuned to natural frequencies where the rotor blade 50 mode of vibration is predominantly in the mid-span region. For example, each vibrational dampening element 300 may be sized to be tuned to a frequency of the rotor blade 50 based on the respective span locations of the airfoil 52 to which they are attached.

Figure 4:
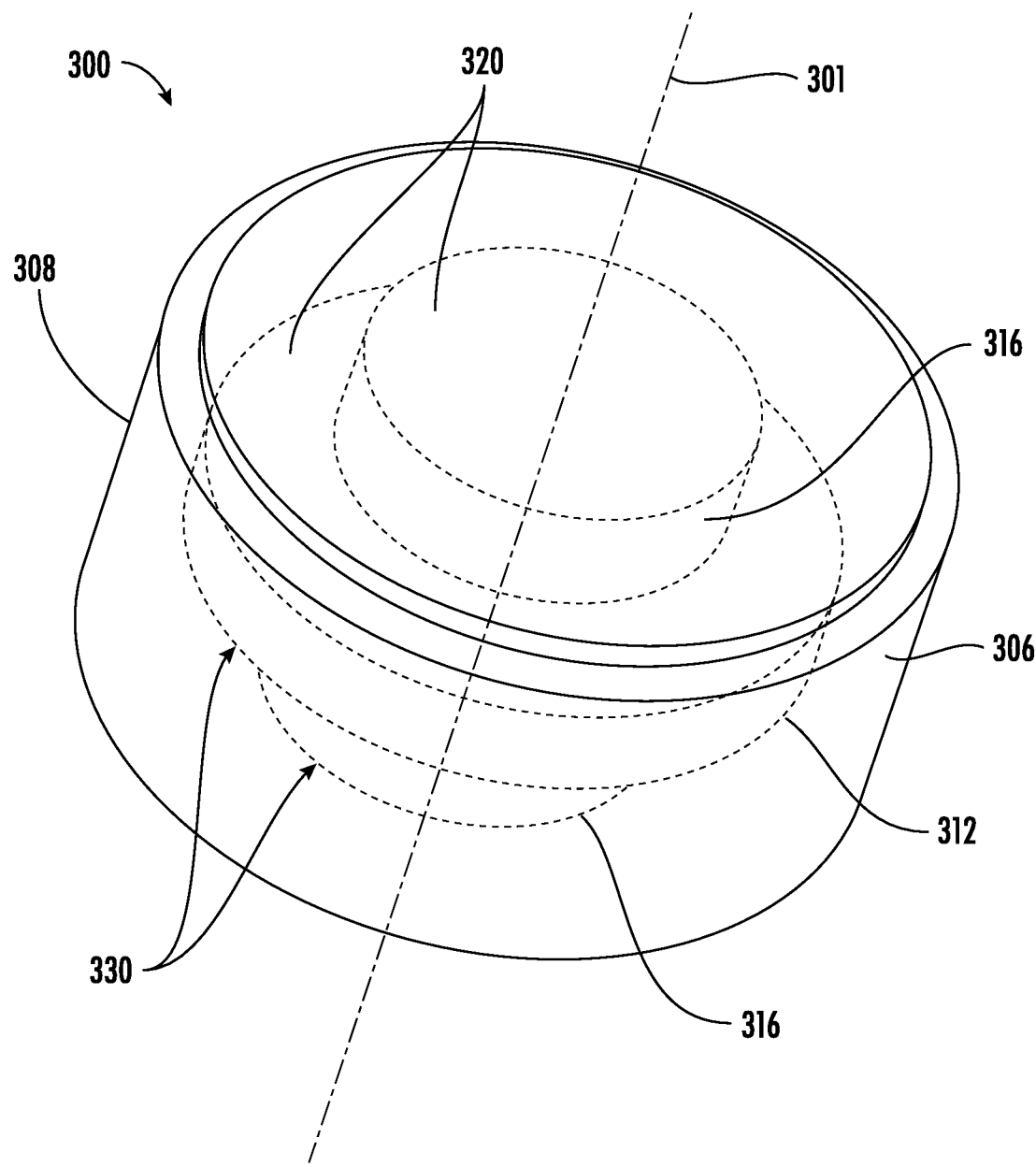
FIG. 4 illustrates a perspective view of a vibrational dampening element, in accordance with embodiments of the present disclosure.
Figure 4:
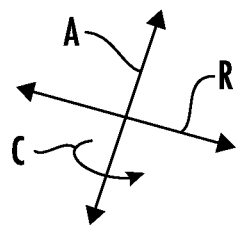
Figure 5:
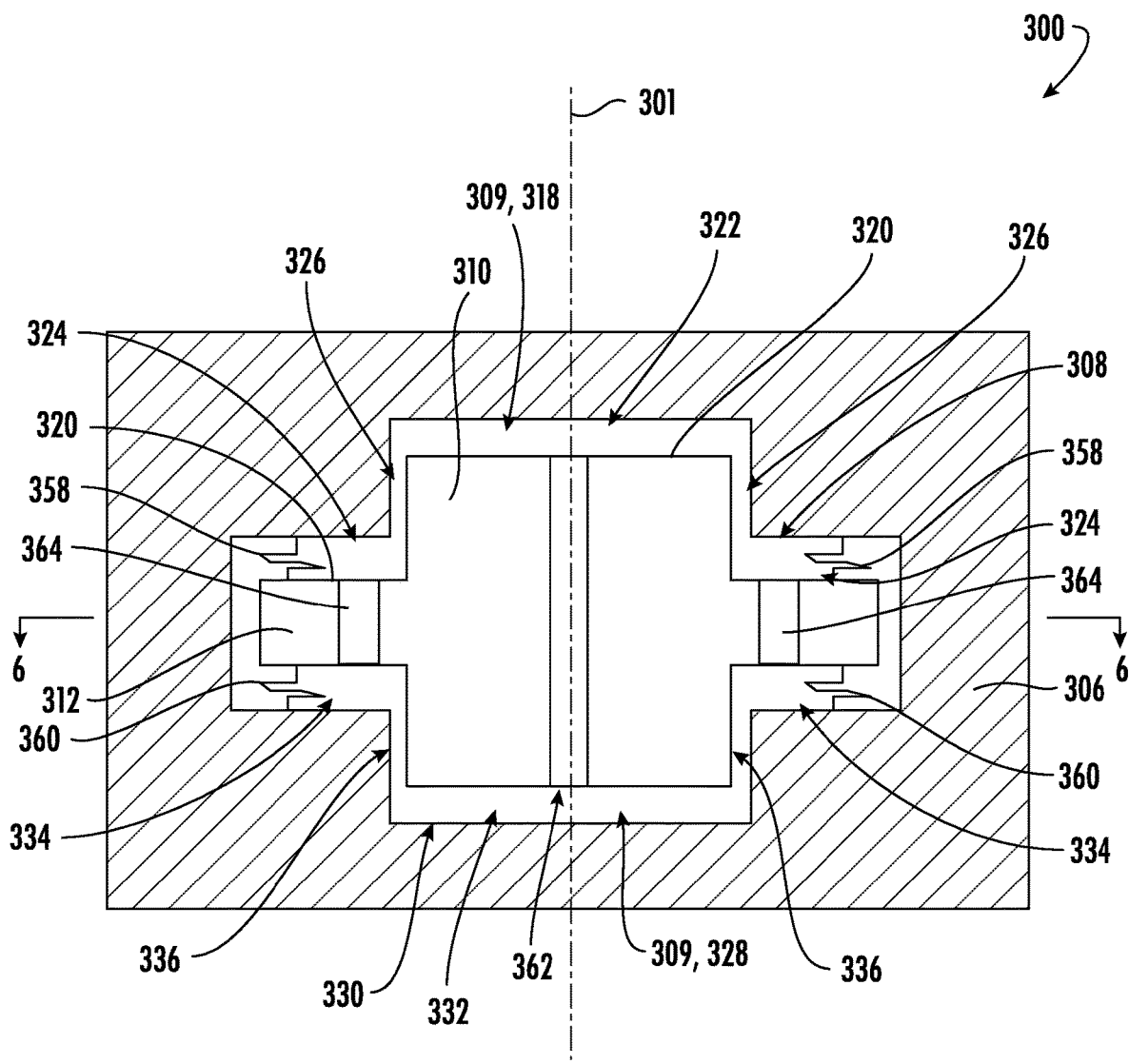
FIG. 5 illustrates a cross-sectional view of the vibrational dampening element shown in FIG. 4 from along a radial direction, in accordance with embodiments of the present disclosure.
Figure 6:
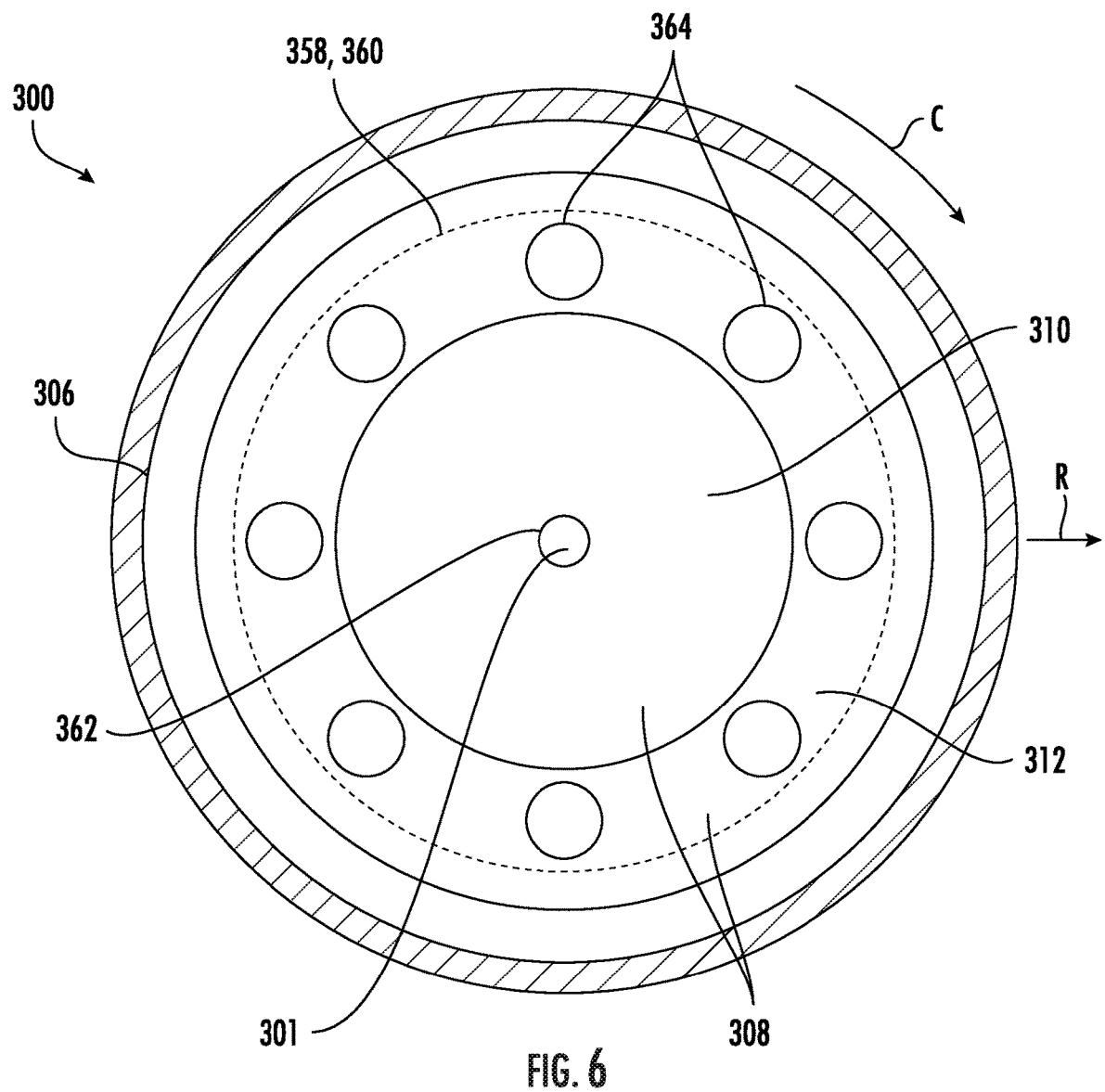
FIG. 6 illustrates a cross-sectional view of the vibrational dampening element shown in FIG. 4 from along an axial centerline of the vibrational dampening element, in accordance with embodiments of the present disclosure.

FIG. 4 illustrates a perspective view of a vibrational dampening element 300, FIG. 5 is a cross sectional view of the vibrational dampening element 300 from along a radial direction R, and FIG. 6 is a cross-sectional view of the vibrational dampening element 300 from along an axial centerline 301. As shown, the axial centerline 301 of the vibrational dampening element 300 defines an axial direction A substantially parallel to and/or along axial centerline 301, a radial direction R perpendicular to axis A, and a circumferential direction C extending around axis A. In exemplary embodiments, the axial centerline 301 of the vibrational dampening element 300 may be aligned (or coaxial) with the direction of oscillations or vibrations of the component to which it is attached.

In many embodiments, the vibrational dampening element 300 includes a casing 306 that encapsulates or surrounds a mass 308. For example, as shown in FIG. 5, the casing 306 may be spaced apart from the mass 308, such that a fluidic chamber 309 is defined in the space between the mass 308 and the casing 306. In this way, the mass 308 may be suspended in fluid within the casing 306, such that the mass 308 is capable of movement relative to the casing 306 and within the fluid. For example, when the vibrational dampening element 300 is attached to an oscillating component, the mass 308 may oscillate within the fluid encapsulated by the casing 306, which forces the fluid between the fluidic portions 318, 328 of the fluidic chamber 309 defined between the casing 306 and the mass 308, thereby dampening the oscillations of the component.

In exemplary embodiments, a fluidic chamber 309 may be defined between the mass and the casing and filled with a fluid (particularly a liquid, such as liquid gallium or other suitable liquids). For example, the casing 306 may define an interior surface having a shape that mimics an exterior surface shape of the mass 308. In various embodiments, the interior surface of the casing 306 may be spaced apart from the mass 308, thereby defining the fluidic chamber in the space between the mass 308 and the casing 306. In many embodiments, the fluidic chamber 309 may include a first fluidic portion 318 and a second fluidic portion 328. The first fluidic portion 318 may be defined between a first side 320 of the mass 308 and the casing 306, and the second fluidic portion 328 may be defined between a second side 330 of the mass 308 and the casing 306.

In exemplary embodiments, the mass 308 may include a main body 310 and a member or annular member 312 that extends from the main body 310. For example, the annular member 312 may extend in the circumferential direction C and surround the main body 310 of the mass 308, such that mass 308 defines a circular cross-sectional shape (FIG. 6). In many embodiments, the main body 310 of the mass 308 may define a first thickness 314, and the annular member 312 of the mass 308 may define a second thickness 316. As shown in FIG. 5, the second thickness 316 of the annular member 312 may be smaller than the first thickness 314 of the main body 310. In this way, the majority of the weight of the mass 308 may be centrally located, i.e., proximate the axial centerline 301 of the vibrational dampening element 300.

As discussed above, a first fluidic portion 318 of the fluidic chamber 309 may be disposed between a first side 320 of the mass 308 and the casing 306. As shown, the first fluidic portion 318 may include a first central portion 322 that extends along the main body 310 on the first side 320, a first accumulator portion 324 that extends along the annular member 312 on the first side 320, and a first connection portion 326 disposed between the first central portion 322 and the first accumulator portion 324. For example, the first central portion 322 may be disposed axially between the first side 320 of the main body 310 and the casing 306 with respect to the axial centerline 301 of the vibrational dampening element 300. The first accumulator portion 324 may be defined axially between the first side 320 of the annular member 312 and the casing 306. In various embodiments, both the first accumulator portion 324 and the first connection portion 326 may be annular passageways that surround the first central portion 322 and are defined in the circumferential direction C. For example, the first central portion 322 may extend radially between the axial centerline 301 and the first connection portion 326, such that the first connection portion 326 provides for fluid communication between the first central portion 322 and the first accumulator portion 324 of the first fluidic portion 318.

In in particular embodiments, as discussed, a second fluidic portion 328 of the fluidic chamber 309 may be disposed between a second side 330 of the mass 308 and the casing 306. As shown, the second fluidic portion 328 may include a second central portion 332 that extends along the main body 310 on the second side 330, a second accumulator portion 334 that extends along the annular member 312 on the second side 330, and a second connection portion 336 disposed between the second central portion 332 and the second accumulator portion 334. For example, the second central portion 332 may be disposed axially between the second side 330 of the main body 310 and the casing 306 with respect to the axial centerline 301 of the vibrational dampening element 300. The second accumulator portion 334 may be defined axially between the second side 330 of the annular member 312 and the casing 306. In various embodiments, both the second accumulator portion 334 and the second connection portion 326 may be annular passageways that surround the second central portion 332 and are defined in the circumferential direction C. For example, the second central portion 332 may extend radially between the axial centerline 301 and the second connection portion 336, such that the second connection portion 336 provides for fluid communication between the second central portion 332 and the second accumulator portion 334 of the second fluidic portion 328.

In various embodiments, the vibrational dampening element 300 may further include a first bellows tube 358 that extends between the first side 320 of the annular member 312 and the casing 306 and a second bellows tube 360 that extends between the second side 330 of the annular member 312 and the casing. The bellows tubes 358, 360 may be compliant, such that they can bend or flex along the axial centerline 301 to allow for the mass to oscillate axially within the fluid and provide viscous damping forces when attached to a vibrating component (such as the turbine rotor blade 50). For example, in exemplary embodiments, mass 308 may suspended within fluid by the first bellows tube 358 and the second bellows tube 360. In various embodiments, the first bellows tube 358 and the second bellows tube 360 may be annular, such that they extend in the circumferential direction C around the main body 310 of the mass 308. In this way, the first bellows tube 358 and the second bellows tube 360 may surround the main body 310 of the mass 308 and partially define the first fluidic portion 318 and the second fluidic portion 328 respectively.

As shown in FIGS. 5 and 6, a primary passage 362 may extend between the first fluidic portion 318 and the second fluidic portion 328, in order to provide for fluid communication therebetween. For, example, the primary passage 362 may extend directly from the first central portion 322 of the first fluidic portion 318 to the second central portion 332 of the second fluidic portion 328. In various embodiments, the primary passage 362 may extend along the axial centerline 301 of the vibrational dampening element 300, such that the primary passage 362 extends coaxially with the axial centerline 301. In other embodiments, multiple primary passages may extend between the first fluidic portion 318 and the second fluidic portion 328 of the fluidic chamber 309, such that they symmetrically surround the axial centerline 301 of the vibrational dampening element 300. In exemplary embodiments, when the vibrational dampening element 300 is attached to a vibrating or oscillating component (such as the turbomachine rotor blade 50 shown in FIG. 3), the primary passage 362 may be oriented generally along the direction of oscillations of the component.

In many exemplary embodiments, the vibrational dampening element 300 may further include a plurality of secondary passages 364 circumferentially spaced apart from one another and defined within the mass 308. The plurality of secondary passages 364 may be disposed around the periphery of the vibrational dampening element 300, such that they are positioned about and surround the axial centerline 301. In particular embodiments, each of the secondary passages 364 may be defined within the annular member 312, such that they each extend generally axially between the first fluidic portion 318 and the second fluidic portion 328. For example, each secondary passage 364 in the plurality of secondary passages 364 may extend through the annular member 312 from the first accumulator portion 324 of the first fluidic portion 318 to the second accumulator portion 334 of the second fluidic portion 328.

The vibrational dampening element 300 described herein may work on the principle of a tuned vibration absorber. For example, during operation of the vibrational dampening element 300, a fluid (particularly a liquid, such as liquid gallium or other suitable liquid) may flow between the first fluidic portion 318 and the second fluidic portion 328 via the primary passage 362 and the plurality of secondary passages 364. For example, when the vibrational dampening element 300 is attached to a vibrating component, such as a turbine rotor blade 50, the viscous forces generated in primary passage 362 and the secondary passages 364 from fluid rapidly traveling between the fluidic portions 318, 328 of the fluidic chamber 309 advantageously dampens the amplitude of oscillations of the vibrating component. The viscous damping forces produced within the vibrational dampening element 300 counteract the vibrations of the component to which the vibrational dampening element 300 is attached and advantageously reduce the amplitude of vibrations of the vibrating component.

In exemplary embodiments, the plurality of secondary passages 364 ensures no pressure build-up in the fluid within the accumulator portions 324, 334, i.e. around the periphery of the vibrational dampening element 300. In this way, the plurality of secondary passages 300 advantageously increase the effectiveness of the vibrational dampening element 300 by ensuring that there are no stiff regions.

In many embodiments, the natural frequency of the vibrational dampening element 300 may be tuned to the mode of interest by changing the stiffness of the bellows tubes 358, 360. Similarly, the natural frequency of the vibrational dampening element 300 may be tuned by adjusting the density, size, or weight of the mass 308. This advantageously allows for the vibrational dampening 300 element to be tuned based on the component it will be attached to, e.g., the first, second, and/or third stage turbine rotor blades may each include a vibrational dampening element 300 that is separately tuned.

The vibrational dampening element 300 described herein may be advantageous over prior designs of dampening elements, e.g., damping elements having only single passage connecting two fluid chambers. For example, the accumulator portions 324, 334 and the plurality of secondary passages 364 ensure that no forces leak into stiffness around the periphery of the dampening element 300 and ensure no pressure build-up in the fluid surrounding the bellows tubes.

Figure 7:
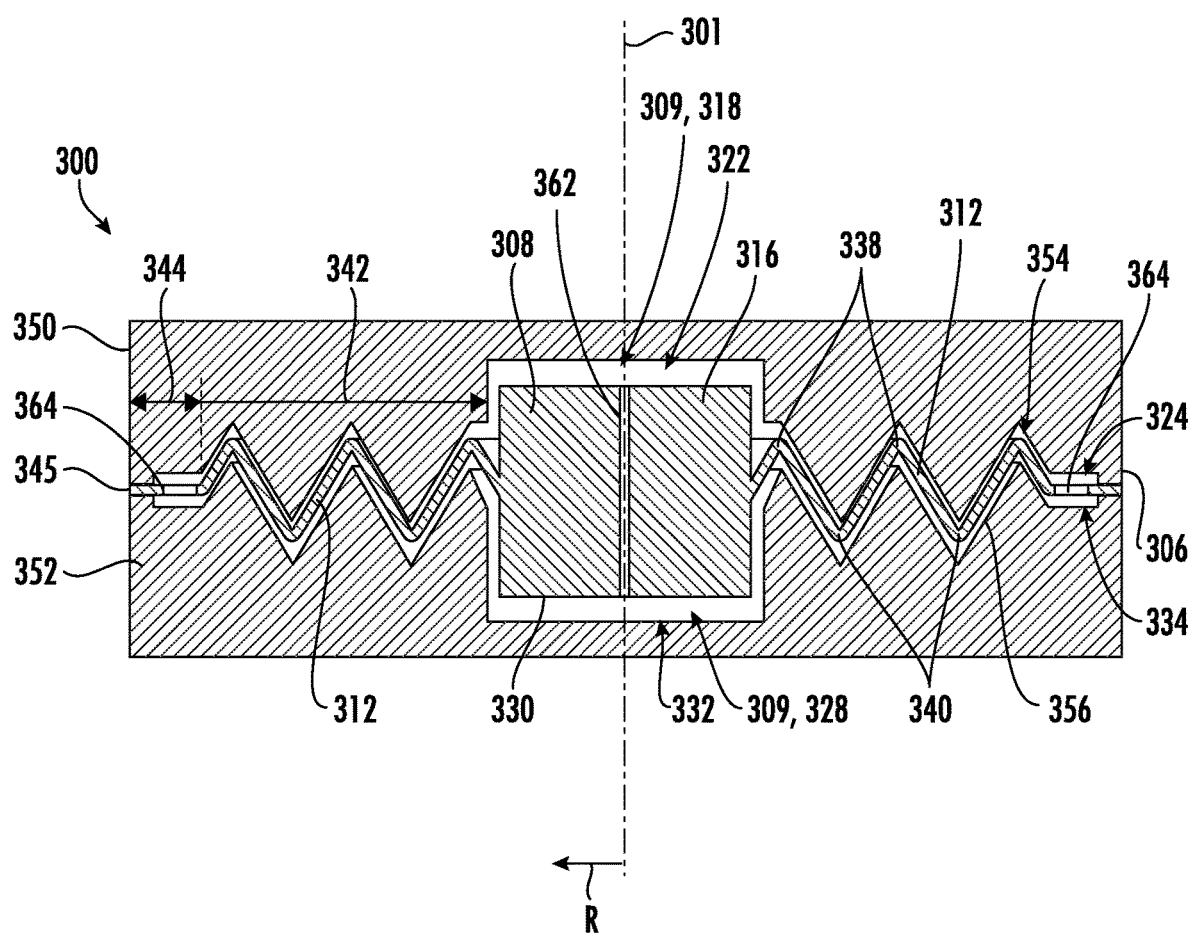
FIG. 7 illustrates a cross-sectional view of a vibrational dampening element from along a radial direction, in accordance with embodiments of the present disclosure.

FIG. 7 illustrates a cross-sectional view of a vibrational dampening element 300 from along a radial direction R, in accordance with embodiments of the present disclosure. As shown, the annular member 312 may be corrugated such that it includes multiple wrinkles, folds, and/or ridges, which advantageously provides for increased compliance in the axial direction (i.e. the direction of oscillation of the mass 308 when attached to a vibrating component).

In various embodiments, the annular member 312 may extend continuously between a corrugated portion 342 and a straight portion 344. The corrugated portion 342 of the annular member 312 may extend continuously between a plurality of peaks 338 and valleys 340, which are axially separated from one another. As shown in FIG. 7, the corrugated portion 342 of the annular member 312 may extend radially from the main body 310 to the straight portion 344. The straight portion 344 may extend radially from the corrugated portion 342 to a free end 345. In the embodiment shown in FIG. 7, the plurality of secondary passages may be defined within the straight portion 344 of the annular member.

As shown in FIG. 7 the casing 306 may be generally spaced from the mass 308, in order to partially define the first fluidic portion 318 and the second fluidic portion 328 on either side of the mass 308. As shown, the casing 306 may include a first portion 350 and a second portion that couple to opposite sides of the mass 308. For example, the first portion 350 may couple to the free end 345 on a first side of the annular member 312, and the second portion 352 of the casing 306 may couple to the free end 345 on a second side of the annular member 312.

In the embodiment shown in FIG. 7, the first fluidic portion 318 may further include a first corrugated passage 354 and a second corrugated passage 356 disposed on opposite sides of the corrugated portion 342 of the annular member 312. For example the first corrugated passage and the second corrugated passage may extend along the corrugated portion 342 on opposite sides of the annular member 312. In such embodiments, as shown, the first accumulator portion 324 of the first fluidic portion 318 and the second accumulator portion 334 of the second fluidic portion 328 may extend along the straight portion 344 on opposite sides of the annular member 312.

Figure 8:
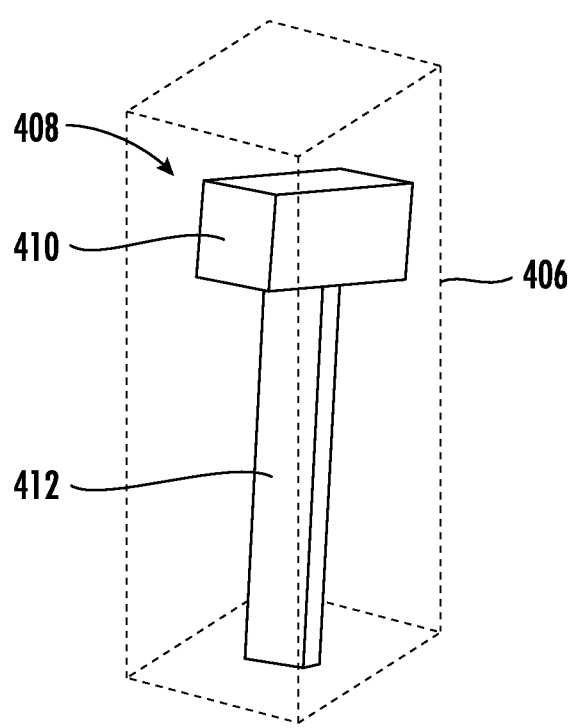
FIG. 8 illustrates a perspective view of a vibrational dampening element, in accordance with embodiments of the present disclosure.
Figure 9:
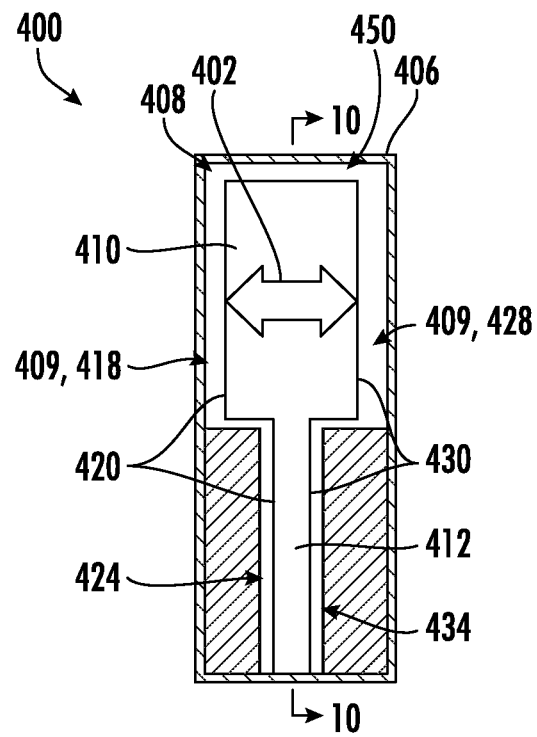
FIG. 9 illustrates a cross-sectional view of the vibrational dampening element shown in FIG. 8, in accordance with embodiments of the present disclosure.
Figure 10:
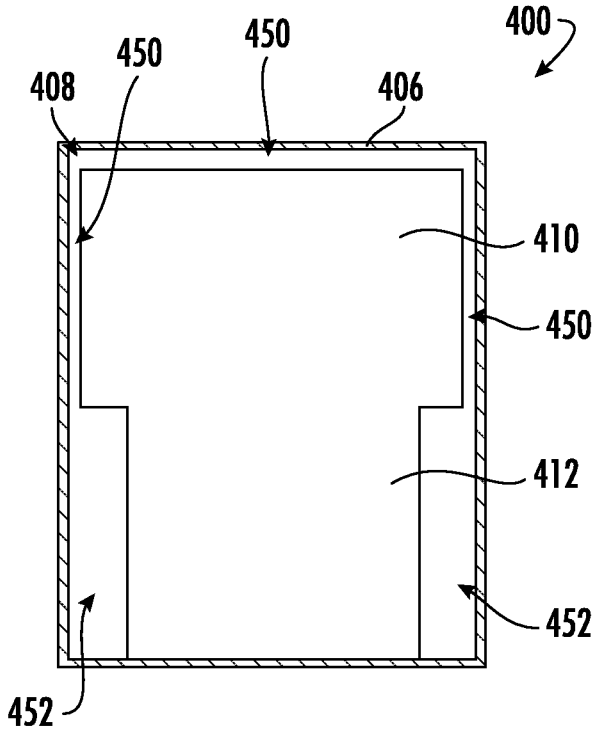
FIG. 10 illustrates a cross-sectional view of the vibrational dampening element shown in FIG. 8, in accordance with embodiments of the present disclosure.

FIGS. 8-10 illustrate a vibrational dampening element 400, in accordance with an alternative embodiment of the present disclosure. As shown, the vibrational dampening element 400 may be a "hammer" damper, such that it includes a large mass attached to a slender beam or member. FIG. 8 illustrates a perspective view of the vibrational dampening element 400, in which the casing 406 is shown in dashed lines. FIG. 9 illustrates a cross-sectional view of the vibrational dampening element 400 from along a first direction, and FIG. 10 illustrates a cross-sectional view of the vibrational dampening element 400 from along a second direction, which is perpendicular to the first direction.

In exemplary embodiments, the vibrational dampening element 400 may include a fluidic chamber 409 that is defined between a mass 408 and a casing 406 and filled with a fluid (particularly a liquid, such as liquid gallium or other suitable liquids). For example, the casing 406 may define an interior surface having a shape that mimics an exterior surface shape of the mass 408. In various embodiments, the interior surface of the casing 806 may be spaced apart from the mass 408, thereby defining the fluidic chamber 409 in the space between the mass 408 and the casing 406. In many embodiments, the fluidic chamber 409 may include a first fluidic portion 418 and a second fluidic portion 428. The first fluidic portion 418 may be defined between a first side 420 of the mass 408 and the casing 406, and the second fluidic portion 428 may be defined between a second side 430 of the mass 308 and the casing 306.

As shown in FIGS. 8-10 collectively, the vibrational dampening element 400 includes a casing 406 that encapsulates or surrounds a mass 408. As shown, the mass 408 may include a main body 410 and a member 412 that extends from the main body and couples to the casing 406. For example, as shown in FIGS. 9 and 10, the member 412 of the mass 408 may be attached to the casing 406 and cantilevered therefrom, such that a first fluidic portion 418 and a second fluidic portion 428 are defined in the space between the mass 408 and the casing 406. In this way, the main body 410 of the mass 408 may be capable of movement relative to the casing 406 and within the fluid held by the fluidic chamber 409. For example, when the vibrational dampening element 400 is attached to an oscillating component (such as a turbomachine rotor blade 50 or other component), the main body 410 of the mass 408 may oscillate within the fluid encapsulated by the casing 406, which forces the fluid to move between the fluidic portions 418, 428 of the fluidic chamber 409 defined between the casing 406 and the mass 408, thereby producing viscous forces that dampen the oscillations of the component.

As shown in FIGS. 9 and 10 a first fluidic portion 418 of the fluidic chamber 409 may be defined between a first side 420 of the mass 408 and the casing 406, and a second fluidic portion 428 of the fluidic chamber 409 may be defined between a second side 430 of the mass and the casing 406. When the vibrational dampening element 400 is attached to a component (such as the turbomachine rotor blade shown in FIG. 3), the first side 420 and the second side 430 may be generally perpendicular a direction of vibrations 402 of the component, such that the fluidic portions 418, 428 of the fluidic chamber are disposed opposite one another with respect to the direction of vibrations 402 of the component. In this way, the first fluidic portion 418 and the second fluidic portion 428 may extend generally perpendicularly to the direction of vibrations 402 of the component. In exemplary embodiments, primary passages 450 may extend along the main body 410 of the mass 408 generally parallel to the direction of vibrations 402 and fluidly couple the first fluidic portion 418 to the second fluidic portion 428.

In many embodiments, the first fluidic portion 418 of the fluidic chamber 409 may include a may further include a first accumulator portion 424 that extends along the member 412 of the mass 408, and the second fluidic portion 428 may include a second accumulator portion 434 that extends along an opposite side of the member 412 as the first accumulator portion 424. For example, the first accumulator portion 424 and the second accumulator portion 434 may extend be disposed on opposite sides of the member 412 and may extend generally perpendicularly to the direction of vibrations 402 of the component. In exemplary embodiments, secondary passages 452 may extend along the member 412 generally parallel to the direction of to the direction of vibrations 402 and fluidly couple the first accumulator portion 424 to the second accumulator portion 434.

Figure 11:
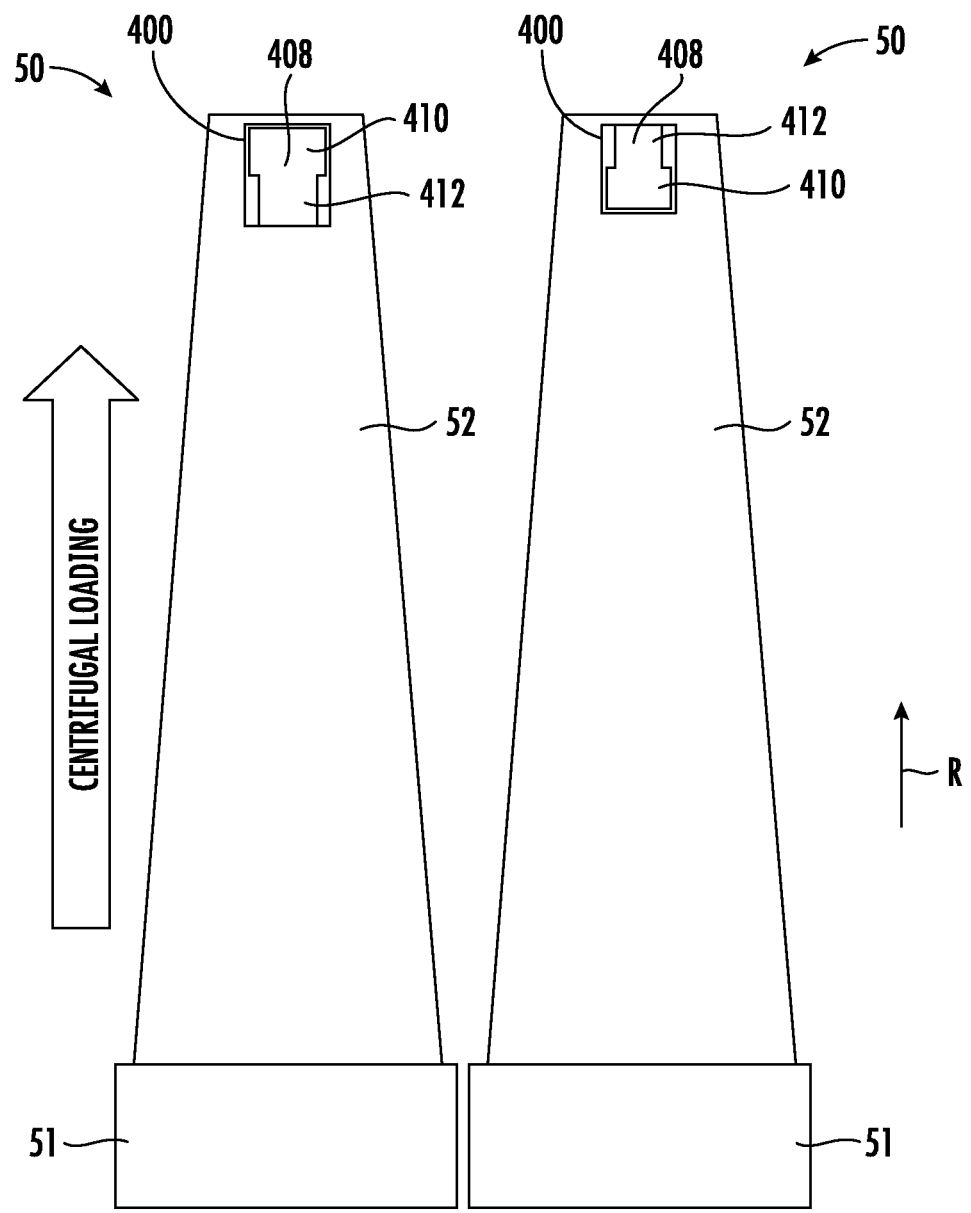
FIG. 11 illustrates two neighboring turbomachine rotor blades, onto which the vibrational dampening element shown in FIG. 8 has been mounted in two different orientations, in accordance with embodiments of the present disclosure.

FIG. 11 illustrates two neighboring turbomachine rotor blades 50, onto which the vibrational dampening element 400 has been mounted in two different orientations. As shown, vibrational dampening element 400 may be mounted to the airfoil 52 such that the main body 410 of the mass 408 is radially outward of the member 412 with respect to the radial direction of the gas turbine 10. In such a configuration, the member 412 may be under a tensile centrifugal loading. In another configuration, as shown, vibrational dampening element 400 may be mounted to the airfoil 52 such that the main body 410 of the mass 408 is radially inward of the member 412 with respect to the radial direction of the gas turbine 10. In such a configuration, the member 412 may be under a compressive centrifugal loading.

During operation of the vibrational dampening element 400, i.e., when the vibrational dampening element 400 is attached to a oscillating or vibrating component, fluid may be forced by the mass 408 to flow between the first fluidic portion 418 and the second fluidic portion 428 via the primary passages 450 and the secondary passages 452. For example, when the vibrational dampening element 400 is attached to an oscillating component, such as a turbine rotor blade 50, the viscous forces are generated in primary passages 450 and the secondary passages 452 from fluid rapidly traveling between the fluidic portions 418, 428 of the fluidic chamber 409. The viscous forces counteract the vibrations of the component and reduce the amplitude of oscillations of the component. In exemplary embodiments, the plurality of secondary passages 452 between the accumulator portions 424, 434 ensures no pressure build-up in the fluid within the accumulator portions 424, 434, i.e. around the member 412.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A vibrational dampening element attached to a turbine component and configured to adjust an amplitude of oscillations of the turbine component, the vibrational dampening element comprising:
   a mass having a main body and a member extending from the main body, wherein the member is an annular member that surrounds the main body of the mass such that the mass defines a circular cross section;
   a casing encapsulating the mass;
   a fluidic chamber defined between the mass and the casing and filled with a fluid;
   a first fluidic portion of the fluidic chamber disposed between a first side of the mass and the casing, wherein the first fluidic portion includes a first accumulator portion that extends along the member;
   a second fluidic portion disposed between a second side of the mass and the casing, wherein the second fluidic portion includes a second accumulator portion that extends along the member, and wherein the first accumulator portion is in fluid communication with the second accumulator portion; and
   a primary passage that extends between the first fluidic portion and the second fluidic portion, wherein the primary passage extends along an axial centerline of the vibrational dampening element.

2. The vibrational dampening element as in claim 1, further comprising a plurality of secondary passages circumferentially spaced apart from one another, wherein each secondary passage in the plurality of secondary passages extends through the member from the first accumulator portion to the second accumulator portion.

3. The vibrational dampening element as in claim 1, further comprising a first bellows tube extending between the first side of the member and the casing and a second bellows tube extending between the second side of the member and the casing.

4. The vibrational dampening element as in claim 3, wherein the mass is suspended within the fluid by the first bellows tube and the second bellows tube.

5. The vibrational dampening element as in claim 1, wherein the annular member is corrugated.

6. The vibrational dampening element as in claim 1, wherein the member is coupled to the casing such that the mass is cantilevered within the fluid within the casing.

7. The vibrational dampening element as in claim 1, wherein the primary passage is oriented generally along a direction of oscillations of the turbine component.

8. A rotor blade, comprising:
   a platform;
   a shank extending radially inward from the platform;
   an airfoil extending radially outward from a root coupled to the platform to a tip, wherein a vibrational dampening element is attached to the rotor blade and configured to adjust an amplitude of oscillations of the rotor blade, the vibrational dampening element comprising:
      a mass having a main body and a member extending from the main body, wherein the member is an annular member that surrounds the main body of the mass such that the mass defines a circular cross section;
      a casing encapsulating the mass;
      a fluidic chamber defined between the mass and the casing and filled with a fluid;
      a first fluidic portion of the fluidic chamber disposed between a first side of the mass and the casing, wherein the first fluidic portion includes a first accumulator portion that extends along the member;
      a second fluidic portion disposed between a second side of the mass and the casing, wherein the second fluidic portion includes a second accumulator portion that extends along the member, and wherein the first accumulator portion is in fluid communication with the second accumulator portion; and
      a primary passage that extends between the first fluidic portion and the second fluidic portion.

9. The rotor blade as in claim 8, wherein the primary passage extends along an axial centerline of the vibrational dampening element.

10. The rotor blade as in claim 8, further comprising a plurality of secondary passages circumferentially spaced apart from one another, wherein each secondary passage in the plurality of secondary passages extends through the member from the first accumulator portion to the second accumulator portion.

11. The rotor blade as in claim 8, further comprising a first bellows tube extending between the first side of the member and the casing and a second bellows tube extending between the second side of the member and the casing.

12. The rotor blade as in claim 11, wherein the mass is suspended within fluid by the first bellows tube and the second bellows tube.

13. The rotor blade as in claim 8, wherein the annular member is corrugated.

14. The rotor blade as in claim 8, wherein the member is coupled to the casing such that the mass is cantilevered within fluid inside of the casing.

15. The rotor blade as in claim 8, wherein the primary passage is oriented generally along a direction of oscillations of the rotor blade.

16. The rotor blade as in claim 8, wherein the vibrational dampening element is a plurality of vibrational dampening elements, each vibrational dampening element in the plurality of vibrational dampening elements attached to the airfoil at different span locations, and wherein each vibrational dampening element is sized to be tuned to a frequency based on the respective span location to which each vibrational dampening element is attached.

17. A vibrational dampening element attached to a turbine component and configured to adjust an amplitude of oscillations of the turbine component, the vibrational dampening element comprising:

a mass having a main body and a member extending from the main body, wherein the member is an annular member that surrounds the main body of the mass such that the mass defines a circular cross section, and wherein the annular member is corrugated;

a casing encapsulating the mass;

a fluidic chamber defined between the mass and the casing and filled with a fluid;

a first fluidic portion of the fluidic chamber disposed between a first side of the mass and the casing, wherein the first fluidic portion includes a first accumulator portion that extends along the member;

a second fluidic portion disposed between a second side of the mass and the casing, wherein the second fluidic portion includes a second accumulator portion that extends along the member, and wherein the first accumulator portion is in fluid communication with the second accumulator portion; and a primary passage that extends between the first fluidic portion and the second fluidic portion.

* * * * *